Patented Sept. 25, 1934

1,974,742

UNITED STATES PATENT OFFICE

1,974,742

SYNTHETIC RESIN AND PROCESS OF MAKING SAME

Horace H. Hopkins, Wilmington, and Frank A. McDermott, Claymont, Del., assignors to E. I. du Pont de Nemours & Company, Wilmington, Del., a corporation of Delaware No Drawing. Application August 14, 1926, Serial No. 129,286

27 Claims. (Cl. 260—8)

This invention relates to synthetic resinous condensation products of polyhydric alcohols with polybasic acids and drying oils, or drying oil acids, with or without other acidic constituents, and the process of making the said products.

Certain resinous compositions are highly valuable in the plastic art and particularly for use in the manufacture of varnishes or lacquers. To be desirable for this purpose, a resin should have the following properties:

(a) Solubility in the solvents used in the varnish and lacquer industry.

(b) Formation with cellulose esters or ethers or drying oils, or a combination of cellulose esters or ethers and compatible modified drying oils, of a hard, durable, non-brittle film.

(c) Compatibility with cellulose esters or ethers or drying oils, or a combination of cellulose esters or ethers and modified drying oils compatible with the cellulose esters or ethers.

The natural resins are sometimes used with cellulose esters or ethers to make lacquers, but they give very brittle films. Moreover, since the most useful of the natural resins are of fossil origin, the supply is limited and the price subject to great fluctuation. Many synthetic resins are known but they have been found to be generally unsatisfactory for our purposes since they do not have all of the necessary properties.

It is known that resinous bodies can be formed by heating a polybasic acid with one of the various polyhydric alcohols, such as glycerol, glycol, glucose, mannitol, cellulose or dextrin, although glycerol is the alcohol generally used. The polybasic acids which are used may vary with corresponding variations in the character of the resins formed.

A brittle resin is obtained when glycerol is esterified with phthalic anhydride; a tough elastic condensation product results when succinic, tartaric, pyrotartaric or citric acid is heated with glycerol, while the glyceride of maleic acid is a flexible, gummy, sticky material. These resins are usually insoluble in those solvents commonly employed in the cellulose lacquer industry and hence are not suitable for use in such lacquers.

It is also known that less brittle and more soluble, resinous materials can be prepared by replacing part of the dibasic acid by certain monobasic acids, such as oleic, palmitic, stearic, butyric, and the acids of rosin. The mixed glyceride of phthalic and oleic acids is soluble in naphtha, turpentine and coal tar oil, while the glyceride of phthalic and butyric acids and the glyceride of phthalic and rosin acids are soluble, respectively, in acetone or mixtures of benzene and alcohol. A somewhat more flexible resin than those mentioned above may be prepared by heating for a suitable time a mixture of glycerol, phthalic anhydride, oleic acid, and castor oil. Despite the increased solubility, flexibility, and water-resistance of these resinous products, we have found them to be unsatisfactory for our purposes since they form films with cellulose esters or ethers or drying oils which are either too soft or too brittle.

One object of this invention is to produce a synthetic resin having the property of hardening by absorption of oxygen at atmospheric temperature, and suited, by reason of this property, for various uses in the arts. Another object is to produce a resin which is initially soluble in various organic reagents, and which, on evaporation of the solvent and hardening, becomes chemically inert and substantially insoluble. A more specific object is to provide synthetic resin compositions which are of value as protective films either alone or in combination with other film-forming ingredients. A further object is to prepare the desired resins by a simple, efficient and economical process.

We have discovered that if drying oil acids or drying oils are heated with a polyhydric alcohol, such as glycerol, and a polybasic acid, for example, phthalic anhydride, with or without resin acids, highly valuable synthetic resins are obtained which attain the objects set forth.

In order to illustrate the invention the following specific examples for the preparation of our synthetic resins are given:

*Example One.*—92 parts by weight of glycerol, 148 parts by weight of phthalic anhydride, and 298 parts by weight of acids obtained by hydrolysis of linseed oil are heated together in an atmosphere of carbon dioxide. The reaction is most conveniently carried out in a vessel of such shape and construction that air may be excluded from the reaction mixture, as by passing a stream of carbon dioxide through the vessel. The phthalic anhydride which escapes from the hot reaction mixture may be condensed on the cool upper portion of the vessel and this sublimate may be returned to the mix by a suitable scraping device. The temperature of the mix is gradually raised to 220° C., care being taken that the evolution of steam from the reaction mixture does not become so rapid as to cause loss of material by foaming. The material is kept at 220° C., a slow stream of carbon dioxide being constantly passed through the reaction vessel in such a way as to protect the reaction mixture from the air. After 7 to 10 hours, the reaction has practically reached completion, but a small amount of free phthalic anhydride may still remain in the reaction mixture. This may be removed by bubbling a rapid stream of carbon dioxide through the molten resin maintained at a temperature of 200–220° C.

The ingredients of the resins are capable of wide variation. For example, additional acids, such as rosin, may be included with valuable results.

*Example Two.*—92 parts by weight of glycerol, 148 parts by weight of phthalic anhydride, 142 parts by weight of linseed oil acids of acid number 197, and 175 parts by weight of rosin of acid number 160, are heated together as in Example One, the entire preparation being carried out in exactly the same manner.

Instead of using acids obtained by the hydrolysis of the drying oils, we have found it possible to use the oils themselves in the manufacture of our resins. The following examples are illustrative.

*Example Three.*—84 parts by weight of glycerol, 148 parts of phthalic anhydride, 150 parts of linseed oil, and 75 parts of rosin of acid #160, are added together as in Example One, the entire preparation being carried out in exactly the same way.

*Example Four.*—87 parts by weight of glycerol, 148 parts by weight of phthalic anhydride, 140 parts by weight of Chinawood oil, and 175 parts by weight of rosin of acid number 160 are heated exactly as described in Example One, except that the heating at 200–220° is continued for only six hours, and the resulting product is not blown with carbon dioxide.

*Example Five.*—The glycerol may be replaced by a glycol. For example, 40 parts by weight of ethylene glycol, 100 parts by weight of phthalic anhydride and 200 parts by weight of linseed oil are heated together at 200° C. for four hours, during which carbon dioxide is passed through the reaction mixture. The temperature is then raised to 250° C. and maintained at that point for about 6 hours, continuing the stream of carbon dioxide. At the end of that time, a clear homogeneous product is obtained.

In the preparation of our resins, particularly when rosin acids are used, we have found that if air is allowed to come in contact with the hot reaction substance, a dark colored resin results. This undesirable condition may be very largely avoided by carrying out the reaction in an atmosphere of a non-oxidizing gas, such as carbon dioxide, nitrogen, hydrogen, carbon monoxide, and the like.

Although we have described a number of reaction mixtures, we wish it to be understood that we do not limit ourselves to the use of the specific substances which we have mentioned. In place of glycerol, we may use other polyhydric alcohols which are stable at the temperature of the reaction, that is, around 200° C. For example, we may use glycols, mannitol or polyglycerols. In place of phthalic anhydride, we may use phthalic acid or other polybasic acids stable at approximately 200° C., or we may use the anhydrides of these acids. We may use, for example, succinic acid, malic acid, maleic acid, fumaric acid, tartaric acid, citric acid, and the like. By the term, drying oil, we wish to designate any of that class of vegetable or animal oils having marked drying properties, such as linseed oil, perilla oil, soya bean oil, China-wood oil, fish oil, and the like. We may use any of these drying oils raw, blown, heat-treated, or otherwise modified, or we may use the corresponding drying oil acids obtainable by the hydrolysis of the raw or modified drying oils. The natural resins which we find suitable for our use, and which we wish to cover in this application include those natural resins such as rosin, copal and the fossil resins which are of an acidic nature and whose acid number is not less than 50. In some instances it is necessary to subject the natural resin used to the treatment known in the varnish industry as "running". If, for instance, run Congo gum is substituted for rosin in Example 4, a less brittle resin is procured. We also wish it to be understood that we do not limit ourselves to the specific method of preparation which we have described, nor to the proportions of the constituents used. The ratio of alcohol to combined acid is preferably maintained at substantially the theoretical ratio required for saturating the polyhydric alcohol, but this is not necessarily the case. Thus, we may suitably vary the ratio of drying oils, drying oil acids, or other acids to obtain a softer or harder product as desired. The temperatures used for the condensation reaction may be varied within suitable limits but it has been found that the reactions are usually best carried out at temperatures of 180°–265° C. The reactions are usually carried out until the evolution of water vapor ceases, thus indicating completion of the reaction.

The resins prepared as described are in general very viscous liquids, with a greenish fluorescence. These resins are compatible with cellulose esters or ethers or drying oils and form hard, durable, non-brittle films with them; they are soluble in linseed, castor or China-wood oils, both raw and blown, and in all common organic solvents except alcohols, in which they are generally insoluble or only slightly soluble. These resins also have another property of great value, namely, that of absorbing oxygen from the air at room temperature, thereby becoming hard, tough and relatively insoluble in most solvents. By virtue of this property, a hard, tough, protective coating similar to shellac may be applied to wood or metal surfaces by covering them with a solution of any of these resins in a solvent and allowing the film formed on evaporation of the solvent to be oxidized by air. The latter phase of this process may be greatly accelerated by the addition of small amounts of metallic driers, such as are used to accelerate the drying of drying oils. Still more rapid hardening of the film may be secured if the resin used is mixed with cellulose esters or ethers in a suitable solvent or mixture of solvents. In this case, a very hard film is obtained after only a few hours' drying. Such films have the important advantages over films of existing cellulose ester lacquers (which contain as their chief constituents cellulose ester and a natural resin) of not being easily deteriorated by the action of sunlight and moisture. Furthermore, one of the chief disadvantages of brushing lacquers now in use, is that when a second coat is applied the solvents of the second coat dissolve the material of the first coat, thus forming a very viscous solution which is difficult to brush and therefore an uneven and an unsightly surface results. The fact that the films containing our new resins become insoluble, makes it possible to apply a second coat after a suitable drying period without experiencing the usual difficult second-coat brushing, since the first coat is not dissolved by the solvents of the second coat.

A valuable variety of the type of resin which forms the subject of this invention may be made by replacing part of the drying oil acids by an equivalent amount of the acids occurring in certain natural resins, such as abietic acid, from rosin, or by the use of other natural resins having an acid number of 50 or more. Films formed from the resulting synthetic resin and cellulose esters or ethers, although more brittle than those resins made with drying oil acids, hardened more rapidly. Since these resins, containing acids from natural resins, are compatible with cellulose esters or ethers, they are valuable in lacquers for cases where rapid hardening is more important than great flexibility. Such resins, either alone or with cellulose esters or ethers, also become insoluble by absorption of atmospheric oxygen. They have substantially the same solubilities as the resins unmodified by the natural resins.

Our new resins are very well adapted for use in oil varnishes and enamels, since they are soluble in drying oils and in the solvents, such as turpentine and petroleum distillates, used in thinning such compositions. The durability and elasticity conferred by these resins make varnishes and enamels containing any of them of great practical value.

It is understood that suitable modifications may be made in the manner of carrying out our process as well as in the materials used without departing from the spirit of our invention.

We claim:

1. The process of producing a synthetic resin which comprises heating to reaction temperature in a non-reactive atmosphere, a reaction mass containing a polyhydric alcohol, a polybasic acid and acids obtainable by hydrolyzing a drying oil.

2. The process of producing a synthetic resin which comprises heating to reaction temperature in an atmosphere of carbon dioxide, a reaction mass containing a polyhydric alcohol, a polybasic acid and acids obtainable by hydrolyzing a drying oil.

3. The process of producing a synthetic resin which comprises heating, under combining conditions, a reaction mass containing a polyhydric alcohol, a resinifying carboxylic acid, and a material containing the acid radical of an oil having drying properties, said reaction being conducted so that the reaction mass is in contact with an inert atmosphere.

4. The process of producing a synthetic resin which comprises heating, under combining conditions, a reaction mass containing a polyhydric alcohol, a resinifying carboxylic acid, and a material containing the acid radical of an oil having drying properties, and passing a stream of inert gas through the mass while it is being heated.

5. The process of producing a synthetic resin which comprises heating, under combining conditions, a reaction mass containing a polyhydric alcohol, a resinifying carboxylic acid, and a material containing the acid radical of an oil having drying properties, and passing a stream of inert gas thru the mass after the reaction has practically reached completion to remove any free carboxylic acid which may still remain in the mass.

6. The process of claim 3, in which the inert atmosphere is carbon dioxide.

7. The process of claim 4, in which the inert gas is carbon dioxide.

8. The process of claim 5, in which the inert gas is carbon dioxide.

9. The process of claim 3, in which the inert gas is rich in carbon monoxide.

10. The process of claim 4, in which the inert gas is rich in carbon monoxide.

11. The process of claim 5, in which the inert gas is rich in carbon monoxide.

12. The process of claim 3, in which the inert gas is nitrogen.

13. The process of claim 4, in which the inert gas is nitrogen.

14. The process of claim 5, in which the inert gas is nitrogen.

15. In the process of making polyhydric alcohol-polybasic acid resins, the step which comprises conducting the reaction in an atmosphere of an inert gas.

16. In the process of making polyhydric alcohol-polybasic acid resins, the step which comprises removing volatile materials by the use of a current of inert gas.

17. In the process of making polyhydric alcohol-polybasic acid resins, the step which comprises removing volatile materials after the reaction has practically reached completion by the use of a current of inert gas.

18. The process of forming the herein described product which comprises heating together a mixture containing a polyhydric alcohol and an organic polybasic acid and an oxidized fatty acid.

19. The process of producing a resinous condensation product which comprises combining a polyhydric alcohol and an organic polybasic acid to form an alkyd resin and modifying such resin by combining therewith during its condensation an oxidized fatty acid.

20. The process of forming a resinous condensation product which comprises heating together a mixture containing a polyhydric alcohol and an organic polybasic acid to form an alkyd resin in its initial state and adding to such mixture with heat an oxidized fatty acid which combines with such initial product to form a modified alkyd resin.

21. An alkyd resin formed by the combination and condensation of a polyhydric alcohol and an organic polybasic acid and an oxidized fatty acid.

22. An alkyd resin containing an oxidized fatty acid combined therewith during the resin-forming condensation reaction.

23. The process of forming the herein described product which comprises heating together a mixture containing a polyhydric alcohol and an organic polybasic acid and acids obtainable by the hydrolysis of blown drying oils.

24. The process of producing a resinous condensation product which comprises combining a polyhydric alcohol and an organic polybasic acid to form an alkyd resin and modifying such resin by combining therewith, during its condensation, acids obtainable by the hydrolysis of blown drying oils.

25. The process of forming a resinous condensation product which comprises heating together a mixture containing a polyhydric alcohol and an organic polybasic acid to form an alkyd resin in its initial state and adding to such mixture, with heat, acids obtainable by the hydrolysis of blown drying oils, which combine with such initial product to form a modified alkyd resin.

26. An alkyd resin formed by the combination and condensation of a polyhydric alcohol and an organic polybasic acid and acids obtainable by the hydrolysis of blown drying oils.

27. An alkyd resin containing acids obtainable by the hydrolysis of blown drying oils combined therewith during the resin-forming condensation reaction.

HORACE H. HOPKINS.
FRANK A. McDERMOTT.